Feb. 10, 1970  D. E. LORENZI ET AL  3,495,166
EDDY CURRENT CRACK DETECTOR SYSTEMS USING CROSSED COILS
Filed April 10, 1967  5 Sheets-Sheet 1

INVENTORS
DONALD E. LORENZI
HAMILTON MIGEL
DONALD T. O'CONNOR

BY
ATTORNEYS

FIG. 5

INVENTORS
DONALD E. LORENZI
HAMILTON MIGEL
DONALD T. O'CONNOR

BY *[signature]* ATTORNEYS

INVENTORS
DONALD E. LORENZI
HAMILTON MIGEL
DONALD T. O'CONNOR

United States Patent Office 3,495,166
Patented Feb. 10, 1970

3,495,166
EDDY CURRENT CRACK DETECTOR SYSTEMS USING CROSSED COILS
Donald E. Lorenzi, Des Plaines, Hamilton Migel, Northfield, and Donald T. O'Connor, Barrington, Ill., assignors to Magnaflux Corporation, Chicago, Ill., a corporation of Delaware
Filed Apr. 10, 1967, Ser. No. 629,541
Int. Cl. G01r 33/12
U.S. Cl. 324—37          6 Claims

ABSTRACT OF THE DISCLOSURE

Eddy current system for detecting cracks in either ferrous or non-ferrous materials. In one arrangement, a pair of identical coils are in a bridge network connected to an AC source and are arranged in crossing relation with their fields perpendicular to each other and parallel to the surface of a part. Variations in conductivity, permeability, lift-off and surface conditions produce substantially no output from the bridge network but defects produce a large output. Modifications and variations are disclosed including the provision of an exciting coil or coils separate from sensing coils, the provision of Hall probes in place of the sensing coils, the provision of additional coils or probes and the placement of the coils or probes in side-by-side relation. A phase detector is usable in the detector circuitry.

---

This invention relates to an eddy current system for detecting flaws and more particularly to an eddy current system for detecting flaws in either ferrous or non-ferrous materials which is highly sensitive to flaws while being insensitive to variations in conductivity, permeability, lift-off and surface conditions. The systems of this invention are very simple in construction and operation while being rugged in construction and accurate and reliable in operation.

Various eddy current systems have heretofore been provided for the detection of cracks or other flaws in a part under test. In general, such systems include field-producing means such as a coil connected to an AC source to generate eddy currents in a part and sensing means to sense the field produced by the eddy currents. The sensing means may be a separate coil, a Hall probe, or any other field responsive device, or the coil of the field-producing means may also be used to sense the eddy current-induced field, by measuring the effective impedance thereof.

In such prior systems, difficulties are encountered due to changes in conductivity and permeability of the part under test and also due to variations in the spacing between the test coil or probe and the surface of the part, and variations in surface conditions. It has been possible to reduce the effect of variations in spacing by certain arrangements such as by the use of impedance networks and by adjustment of operating frequency. Such arrangements, however, have not overcome the sensitivity to conductivity and permeability changes. To reduce the effect of permeability and conductivity changes, differentially connected coils have been used. However, such arrangements have been insensitive to defects common to the differentially connected coils.

This invention was evolved with the general object of overcoming the disadvantages of prior eddy current testing systems and of providing a system which is very sensitive to defects while being insensitive to variations in other physical characteristics of a part under test and variations in the physical relation of a test probe to the part.

Another object of the invention is to provide an eddy current testing system which is relatively simple while being very rugged in construction and accurate and reliable in operation.

In accordance with an important feature of this invention, an eddy current system is provided which includes field-sensing means for sensing fields produced by eddy currents in two regions having substantially the same spacial relation to a surface of the part and having a substantial angle therebetween with detector means being provided for detecting differences between the fields produced in the two regions. With this arrangement, a high degree of sensitivity is obtained with respect to flaws having different orientations with respect to the sensing regions, while being very insensitive to changes in conductivity and permeability and to changes in the spacing between the sensing means and the part. It is found that almost all defects which are of interest in the testing of a part have a dimension which is greater in one direction than in another and with a substantial angle being provided between the sensing regions, a high degree of sensitivity to significant types of defects is obtained. At the same time, the sensing regions can be quite close together so as to obtain extremely low sensitivity to variations in spacing or in surface conditions, while also obtaining very low sensitivity to changes in conductivity and permeability.

According to another important feature of the invention, the sensing regions are crossed to intersect at midpoints thereof so that the area of the part which is inspected is minimized and so that the sensing regions always have the same physical relationship to the part being inspected.

According to a specific feature of the invention, the angle between the sensing regions is approximately 90 degrees, to obtain maximum sensitivity to defects.

According to another specific feature of the invention, the sensing regions are relatively long and narrow with transverse dimensions equal to a small fraction of the long dimension thereof, to obtain high resolution and to facilitate detection and location of narrow cracks within a part.

In accordance with a further feature of the invention, a pair of coils are used which are located in planes generally transverse to the surface of the part.

In certain of the arrangements according to the invention, the pair of coils are used as part of the field-producing means by connection thereof to an AC source. The same coils may be used as part of the sensing means, or may be used only in the sensing means with another coil or coils being used in the field-producing means. In one arrangement, the field-producing means comprises a coil having an axis generally parallel to a line at the intersection of the planes of a pair of coils used in the sensing means.

In accordance with an important feature of the invention, the coils have matched inductances and resistances, to obtain an accurate balance and to minimize sensitivity to conductivity and permeability variations and sensitivity to changes in the spacing between the coils and the test part.

In one arrangement in which the same pair of coils are both used in the field-producing and field-sensing means, a bridge circuit is provided having two branches each having two legs with the two branches being connected to an AC voltage source. The pair of coils forms two legs of the bridge circuit while impedance means form the other two legs of the bridge circuit and detector means are provided connected between the junction of the legs of one of the branches and the junction of the legs of the other of the branches. This arrangement further facilitates the attainment of an accurate balance and minimizes sensitivity to conductivity and permeability changes and to changes in spacing.

With only one pair of coils, it is possible to miss defects located exactly along an angle intersecting the angle between the coils. Although this deficiency is not usually serious, it can be obviated by the provision of a second pair of coils in planes generally transverse to each other and at angles to the planes of the first pair of coils. Preferably, a special bridge circuit is provided interconnecting all four coils in this arrangement.

According to a specific feature of the invention, a bobbin is provided having a pair of narrow slits formed in an end face thereof in planes transverse to each other and generally normal to the end face with a pair of coils being wound in the slits to cross at a central point of the end face. Preferably, the slits have a width less than 10% of the length thereof along the end face and most preferably, the width of the slits is on the order of 4% of the length thereof. In one arrangement, the bobbin is of a non-magnetic material while in another arrangement, coils are wound on a core of a magnetic material.

Another important feature of the invention is in the provision of field-sensing means in the form of a pair of Hall probes, the Hall probes being in the form of flat plates which are preferably in transverse planes generally normal to the surface of the part.

According to a specific feature of the invention, the plates have mid-lines at the intersection of the planes and preferably, slots are formed in the plates along the mid-lines to permit an interlocking arrangement thereof.

In the arrangements using Hall probes, the field-producing means may preferably be in the form of a pair of coils, in alignment with the Hall probes.

Further features of the invention relate to the provision of detector means which includes two selectively usable types of detectors. An amplitude detector is usable to develop an output proportional to the difference in amplitude of alternating fields produced in the sensing regions. In addition, a phase detector is provided which is coupled to the same source of alternating current to which the field-producing means is coupled and which receives a signal proportional to the difference between the alternating fields produced in the sensing regions. The phase detector is operative to produce optimum response to certain types of defects in certain types of parts. Preferably, an adjustable phase shifter is provided to couple the phase detector to the alternating current source, to permit adjustment of the phase to obtain optimum response under various operating conditions.

This invention contemplates other objects, features and advantages which will become more fully apparent from the following detailed dectription taken in conjunction with the accompanying drawings which illustrate preferred embodiments and in which.

Figure 1:
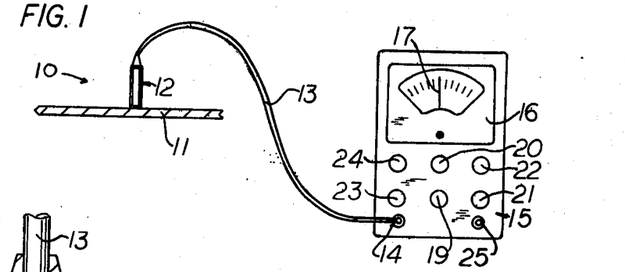
FIGURE 1 illustrates a crack detector instrument constructed in accordance with the principles of this invention, in use in testing a part.

Reference numeral 10 generally designates an eddy current instrument constructed in accordance with the principles of this invention and particularly designed for the detection of cracks in a part 11. The instrument 10 comprises a probe unit 12 which is movable over the part 11 and which is connected to a cable 13 terminated in a jack which is inserted in a plug 14 of an energizing and indicating unit 15. The unit 15 includes a meter 16 having a pointer 17. When the part 11 is homogeneous, the pointer 17 remains in a centered zero position as the probe 12 is moved over the part 11 or as the probe 12 is moved toward and away from the part 11. However, when the probe 12 is moved over a crack or similar defect in the part 11, the pointer 17 is deflected to indicate the defect.

The unit 15 includes suitable control knobs which may include an on-off control 19, a gain control knob 20, balance adjustment knobs 21 and 22, a phase detector on-off control knob 23 and a phase adjustment knob 24. An additional jack 25 is provided for connection of the unit to a suitable recorder.

Figure 2:
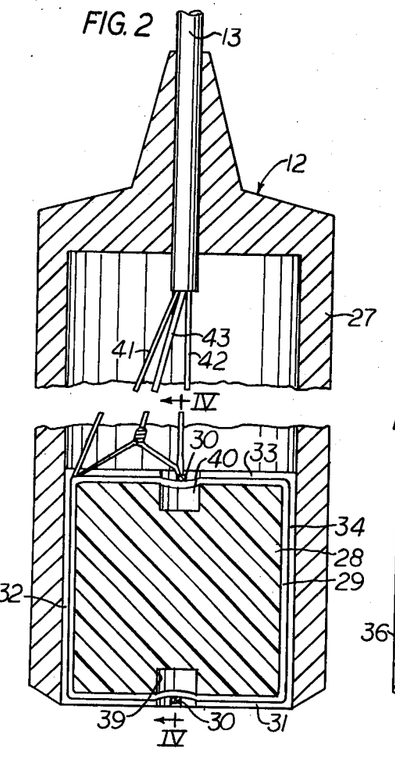
FIGURE 2 is an elevational cross-sectional view of a probe unit of the instrument.
Figure 3:
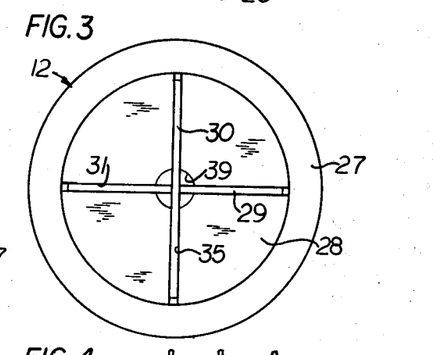
FIGURE 3 is a bottom plan view of the probe unit.
Figure 4:
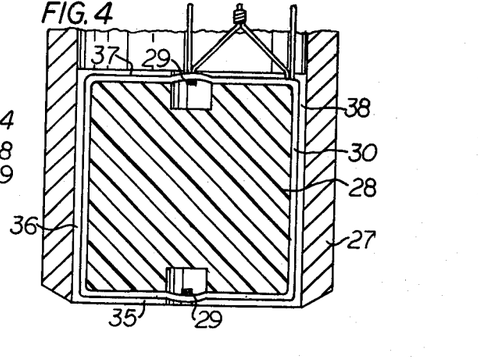
FIGURE 4 is a cross-sectional view taken substantially along line IV—IV of FIGURE 2.

Referring to FIGURES 2–4, the probe unit 12 comprises a hollow cylindrical casing 27 which is preferably of a non-metallic electrically insulating material. A cylindrical bobbin 28 is fixed within the casing 27 and supports a pair of crossed coils 29 and 30 which are wound in narrow slits formed in the bobbin 28. In particular, coil 29 has portions disposed in a slit 31 extending across the lower end face of the bobbin 28, a slit 32 formed along one side of the bobbin 28, a slit 33 extending across the upper end face of the bobbin 28, and a slit 34 extending along the opposite side of the bobbin 28. Similarly, the coil 30 has portions disposed in a slit 35 extending across the lower end face of the bobbin 28, a slit 36 extending along one side of the bobbin 28, a slit 37 extending across the upper end face of the bobbin 28, and a slit 38 extending along the opposite side of the bobbin 28.

In the illustrated arrangement, the slits are so formed that the coils 29 and 30 are in planes at right angles to each other and intersecting along a line through the central axis of the probe unit 12. This is the preferred arrangement, but it should be noted that other arrangements are possible. It is not necessary in all cases that the coils be crossed and they can be in side-by-side relation and it is not always necessary that the coils be at right angles to each other. In any case, however, it is highly desirable that the portions of the coils which are adjacent the part should be relatively close together and should have a substantial angle therebetween.

The slits formed in the bobbin 28 and particularly the portions 31 and 35 formed in the lower end face should be very narrow, preferably having a width less than 10% of the diameter of the bobbin 28 and most preferably on the order of about 4% of the diameter of the bobbin 28, to obtain maximum sensitivity to narrow cracks in the part 11. By way of example, and not by way of limitation, the diameter of the bobbin 28 may be 0.375 inch and the slits may have the same proportions as illustrated in the drawing.

It is noted that the illustrated bobbin 28 has a lower planar end face which is usually preferred, but the end face can be convex if desired.

In the illustrated embodiment, the coil 29 is wound first, to be overlapped by the coil 30. To provide additional space at the cross-over points, recesses 39 and 40 are preferably formed in the central portions of the lower and upper faces of the bobbin 28. If desired, individual turns or layers of the two coils can be interleaved which is advantageous in obtaining the same spacial relationship of the coils with respect to the part and in obtaining the same coil inductances and resistances, which is important. With narrow coils, however, the interleaving feature is not essential.

To connect the coils to the unit 15, a conductor 41 of the cable 13 is connected to one end of the coil 29, the conductor 42 is connected to one end of the coil 30, and a conductor 43 is connected to the other ends of both coils 29 and 30.

Figure 5:
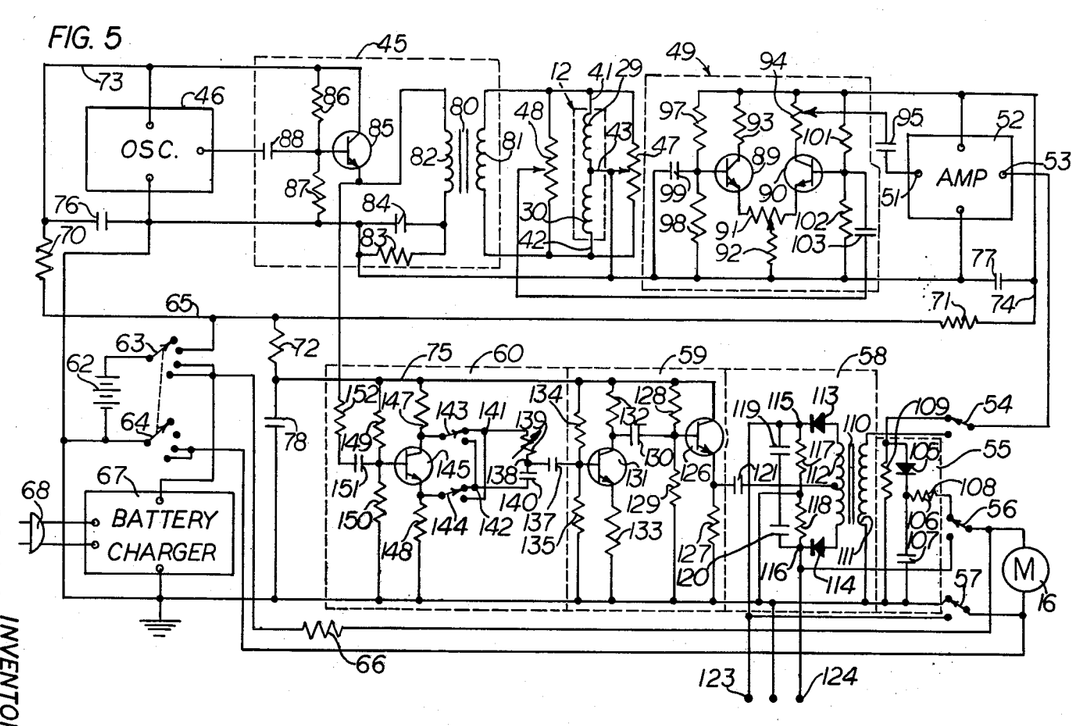
FIGURE 5 is a schematic circuit diagram of the instrument.

Referring now to FIGURE 5, the coils 29 and 30 are connected to the output of a driver stage 45 having an input connected to the output of an oscillator 46, to cause alternating current to flow through the coils 29 and 30 and to develop magnetic fields within the part 11. By way of example, and not by way of limitation, the oscillator 46 may be operated at a frequency of 100 kc.

A pair of balance potentiometers 47 and 48 are provided, operated by the knobs 21 and 22, and connected between the conductors 41 and 42 which are connected to the output of the driver stage 45. The movable contact of the potentiometer 47 is connected to the conductor 43 and also to ground. The movable contact of the potentiometer 48 is connected to one input of a differential amplifier 49, the other input of which is connected to ground. The output of the differential amplifier 49 is connected to an input terminal 51 of an amplifier 52 having an output terminal 53 which is connected to a selector switch contact 54, operated by the knob 23. In the illustrated position, the selector switch contact 54 is connected to the input of an amplitude detector 55 which is connected through additional selector switch contacts 56 and 57 to the meter 16.

With the circuit as thus far described, any difference in the fields induced in the coils 29 and 30 from eddy currents within the part 11 is amplified by the differential amplifier 49 and the amplifier 52 to produce an output from the detector 55 which is applied to the meter 16. Since the coils have the same characteristics and the same relationship to the part 11, no output is produced during movement of the probe 12 over a homogeneous part or during movement of the probe 12 toward or away from a part. However, if the part 11 has a crack therein and oriented differently with respect to the coils 29 and 30, an indication is produced on the meter 16.

In the opposite position of the selector switch contacts, the output of the amplifier 52 is connected to one input of a synchronous or phase detector 58 the output of which is connected through the selector switch contacts 56 and 57 to the meter 16. A second input of the detector 58 is connected to the output of an amplifier 59 having an input connected to the output of an adjustable phase shifter 60 which has an input connected to an output of the driver stage 45. The phase detector 58 operates to detect components of the differential signal which are in phase with the reference applied from the phase shifter circuit 60, to develop a corresponding indication on the meter 16. The phase shifter 60 is adjusted to obtain optimum response, according to the character of the part being inspected and the type of defect to be detected. It is possible, also, by adjustment of the phase shifter 60 to minimize response to types of defects or to variations to which response is not desired.

To supply operating power for the instrument, a battery 62 is provided having positive and negative terminals connected to selector switch contacts 63 and 64, the negative terminal being also connected to ground. The contacts 63 and 64 are movable from an "off" position as illustrated to a "on" position wherein the contact 63 is connected to a line 65, and thence to "test" and "charge" positions wherein the contact 63 is connected through a resistor 66 to the meter 16 and to one terminal of a battery charger 67 and wherein the contact 64 is connected to the other terminal of the meter 16. The other terminal of the battery charger 67 is connected to the negative terminal of the battery 62, and the battery charger 67 is connected to a plug 68 for connection to a supply of AC current. Line 65 is connected through resistors 70, 71 and 72 to lines 73, 74 and 75 which are connected through capacitors 76, 77 and 78 to ground.

The driver stage 45 comprises an output transformer 80 having a secondary winding 81 connected through the conductors 41 and 42 to the coils 29 and 30 and also connected to the potentiometers 47 and 48. A primary winding 82 has one terminal connected through a resistor 83 and a capacitor 84 to ground and an opposite terminal connected to the emitter of a transistor 85 having a collector connected to the line 73. The base of the transistor 85 is connected through a resistor 86 to the line 73, through a resistor 87 to ground and through a capacitor 88 to the output of the oscillator 46.

The differential amplifier 49 comprises a pair of transistors 89 and 90 having emitters connected to opposite end terminals of a balance potentiometer 91, the movable contact of potentiometer 91 being connected through a resistor 92 to ground. The collectors of the transistors 89 and 90 are connected through a resistor 93 and a potentiometer 94 to the line 74, the contact of potentiometer 94 being connected through a coupling capacitor 95 to the input terminal 51 of the amplifier 52. The base of the transistor 89 is connected through a resistor 97 to the line 74, through a resistor 98 to ground and also through a capacitor 99 to ground. The base of the transistor 90 is connected through a resistor 101 to the line 74, through a resistor 102 to ground and through a coupling capacitor 103 to the contact of the potentiometer 48.

With this arrangement, a signal is applied through capacitor 103 to the base of transistor 90 corresponding to the difference in the magnetic fields affecting the coils 29 and 30 and an amplified signal introduced at the collector of transistor 90, a portion of which is applied to the input of the amplifier 52, according to the position of adjustment of the potentiometer 94. Since the base of transistor 89 is grounded through the capacitor 99, no amplification function is performed by the transistor 89, but transistor 89 is desirable in this circuit in minimizing the effect of variations such as power supply variations and in otherwise stabilizing the operation.

The potentiometers 47 and 48 are adjustable to obtain balance. It is important to note, however, that the coils 29 and 30 should be wound with considerable care to have, as nearly as possible, exactly the same resistances and inductances and to have the same physical relationship to the part, so as to insure the attainment of a proper balance under all conditions except, of course, when a crack is detected.

The detector 55 comprises a diode 105 connected between the selector switch 54 and a circuit point 106 which is connected through a capacitor 107 to ground and through a resistor 108 to the selector switch 56, a resistor 109 being connected between the switch 54 and ground. With this circuit, a positive DC voltage is developed at the circuit point 106 proportional to the amplitude of the difference between the magnetic fields detected by the coils 29 and 30, the DC voltage so developed being applied through the resistor 58 to the meter 16.

The phase detector 58 comprises a transformer 110 having a primary winding 111 connected between ground and the switch 54. A secondary winding 112 of the transformer 110 has end terminals connected through diodes 113 and 114 to circuit points 115 and 116 which are connected to ground through resistors 117 and 118 and capacitors 119 and 120. A center tap of the transformer secondary winding 112 is connected through a coupling capacitor 121 to the output of the amplifier 59.

With this circuit, voltages are developed at circuit points 115 and 116 corresponding to the components of the difference between the magnetic fields applied to coils 29 and 30 which are in phase and out of phase with the reference signal applied from the amplifier 59. Circuit points 115 and 116 are connected through the selector switch contacts 56 and 57 to the meter 16 and may also be connected to terminals 123 and 124 for connection to a recorder or the like.

The amplifier 59 comprises a transistor 126 having an emitter connected through the capacitor 121 to the center tap of the transformer winding 112 and also connected through a resistor 127 to ground. The collector of the transistor 126 is connected to the line 75 and the base thereof is connected through a resistor 128 to the line 75, through a resistor 129 to ground and through a capacitor 130 to the collector of a transistor 131, the collector being connected through a resistor 132 to the line 75. The emitter of the transistor 131 is connected through resistor 133 to ground while the base thereof is connected through a resistor 134 to the line 75 and through a resistor 135 to ground.

In the adjustable phase shifter 60, a capacitor 137 is provided which is connected between the base of the transistor 131 and a circuit point 138 connected through an adjustable resistor 139 and a capacitor 140 to circuit points 141 and 142, respectively. Circuit points 141 and 142 are connected through selector switches 143 and 144 to the collector and emitter of a transistor 145 in the position of the selector switches 143 and 144 as illustrated, and vice versa in the opposite positions of the selector switches. The collector and emitter of the transistor 145 are connected through resistors 147 and 148 to the line 75 and to ground. The base of the transistor 145 is connected through a resistor 149 to the line 75, through a resistor 150 to ground and through a capacitor 151 and a resistor 152 in series to the emitter of the transistor 85 in the driver stage 45.

The transistor 145 operates as a phase-splitter to apply signals of opposite phase to the circuit points 141 and 142 and by adjustment of the resistor 139 at a desired phase through nearly 180 degrees can be obtained so that by operation of the selector switches 143 and 144, any desired phase through substantially 360 degrees can be obtained.

Figures 6, 7:
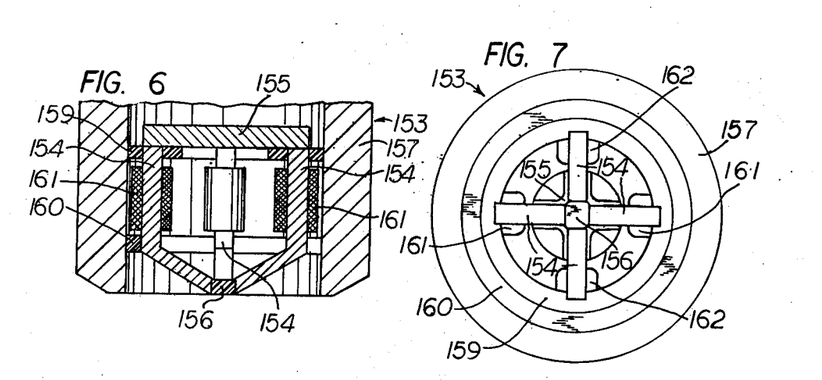
FIGURE 6 is a cross-sectional view of an end portion of a modified probe constructed in accordance with the principles of the invention.
FIGURE 7 is a bottom plan view of the probe shown in FIGURE 6.

Referring now to FIGURE 6, reference numeral 153 generally designates a modified probe unit in which a magnetic core is provided which comprises four generally L-shaped members 154 of magnetic material having vertical leg portions the upper ends of which are secured against the undersides of the outer end portions of four radially extending arms of a spider member 155 of magnetic material and having leg portions extending angularly downwardly and inwardly to terminal end faces engaged with the four sides of a square spacer member 156 of insulating material. The members 154 and 155 are supported within a hollow cylindrical housing 157 by means of a pair of support rings 159 and 160. The members 154 are preferably arranged in equiangularly (90 degree) spaced relation, and one pair of coils 161 are wound on the vertical leg portions of one pair of diametrically opposed members, while a second pair of coils 162 are wound on the vertical leg portions of the other pair of diametrically opposed members.

Each pair of coils 161 and 162 is connected in series and the two pairs of coils may be connected in the circuit of FIGURE 5 in place of the coils 29 and 30.

With the magnetic core a higher inductive reactance can be obtained, a greater sensitivity can be obtained, and it is possible to obtain greater resolution, so as to permit accurate location of very narrow cracks. Considerable care should be exercised in winding the pairs of coils 161 and 162 to obtain the same inductive reactances and resistances in all coils and an accurate balance.

Figures 8, 9:
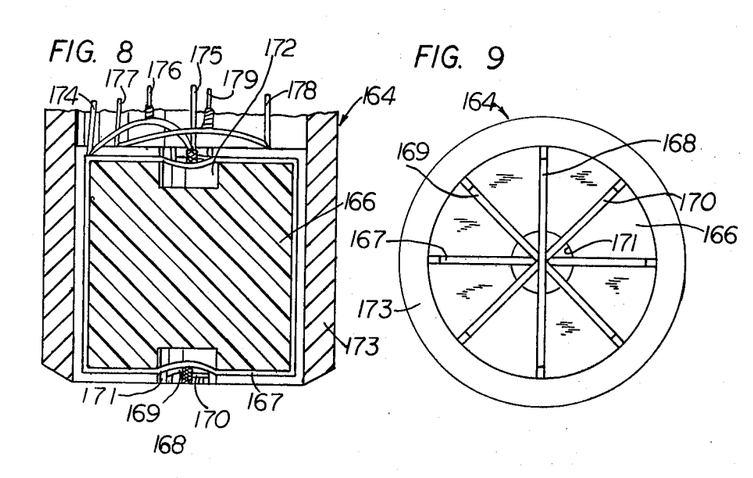
FIGURE 8 is a cross-sectional view of an end portion of another modified probe constructed in accordance with the principles of this invention.
FIGURE 9 is a bottom plan view of the probe shown in FIGURE 8.

Referring to FIGURES 8 and 9, reference numeral 164 generally designates another modified form of probe wherein a bobbin 166 is provided which is susbtantially identical to the bobbin 28 of the probe 12, except that additional slits are formed therein to receive both a first pair of coils 167 and 168 and a second pair of coils 169 and 170. The bobbin 166 has central recesses 171 and 172 in its lower and upper end faces to provide space for crossovers of the coils and is supported within a hollow cylindrical housing 173. Both pairs of coils are in transverse planes intersecting at the axis of the housing 173 and the planes of the coils 169 and 170 lie at 45 degree angles to intersect the angles between the planes of the coils 167 and 168. Preferably, all four coils are wound to have exactly the same inductances and resistances. Ends of the coils 167 and 168 are connected to conductors 174 and 175 while the opposite ends thereof are connected together and to a conductor 176. Similarly, ends of the coils 169 and 170 are connected to conductors 177 and 178 while the opposite ends thereof are connected together and to a conductor 179.

Figure 10:
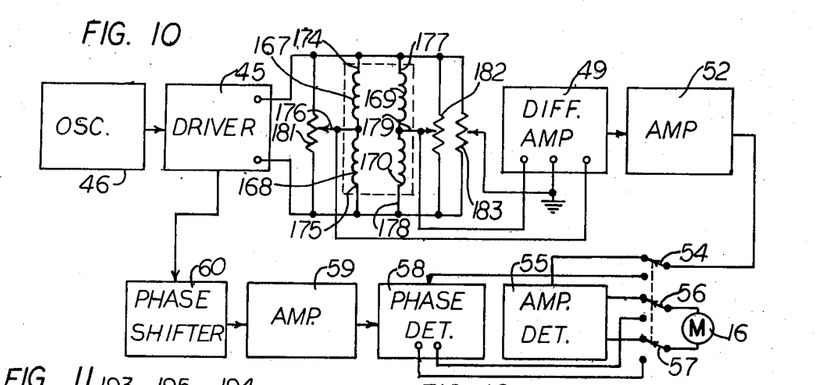
FIGURE 10 is a schematic diagram illustrating the connection of the coils of the probe unit of FIGURES 8 and 9 in the circuit of the instrument.

FIGURE 10 shows the connection of the coils in the energizing and indicating circuit. Conductors 174 and 177 are connected together and to one terminal of the output of the driver stage 45 while conductors 175 and 178 are connected together and to the other terminal of the driver stage output. A pair of potentiometers 181 and 182 are connected to the driver stage output and have movable contacts connected to the conductors 176 and 179 which are connected to input terminals of the differential amplifier 49, to apply signals to the base electrodes of the transistors 89 and 90 therein. An additional potentiometer 183 is connected across the driver stage output and has a movable contact connected to ground. As above noted, the coils 167–170 preferably have the same inductances and resistances. The potentiometers 181–183, however, are adjustable to insure an exact balance. When the probe 164 is moved over a homogeneous part or toward and away from a homogeneous part, no output signal is developed. However, if there is a crack in the part, it will produce an unbalance and an output indication will be produced on the meter 16, regardless of the orientation of the crack. This arrangement overcomes a possible difficulty with the probe arrangement of FIGURES 2–4, in that a crack oriented exactly at 45 degrees relative to the coils in the arrangement of FIGURES 2–4 might produce no output indication.

Figure 11:
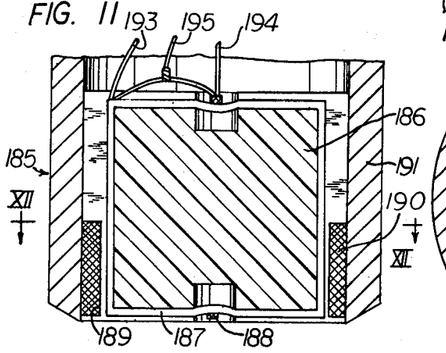
FIGURE 11 is a cross-sectional view of an end portion of another modified probe constructed in accordance with the principles of this invention.
Figure 12:
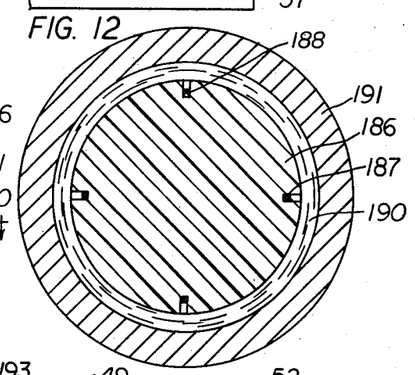
FIGURE 12 is a cross-sectional view taken substantially along line XII—XII of FIGURE 11.

Referring to FIGURES 11 and 12, reference numeral 185 generally designates a further modified probe arrangement wherein a bobbin 186 is provided having slits formed therein in which coils 187 and 188 are wound in a manner substantially identical to the winding of the coils 29 and 30 in the bobbin 28 of the probe 12 of FIGURES 2–4. In this arrangement, however, the bobbin 186 is of somewhat larger diameter and is provided with a peripheral groove 189 in which a coil 190 is wound, the bobbin 186 with the coils thereon being supported within a hollow cylindrical housing 191. The coils 187 and 188 lie in transverse planes intersecting at the axis of the housing 191 and at the axis of the coil 190.

Figure 13:
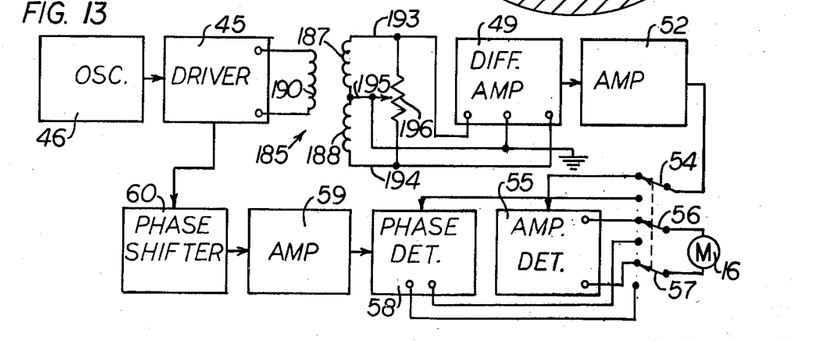
FIGURE 13 is a schematic diagram illustrating the connection of coils of the probe of FIGURES 11 and 12 in the instrument.
Figure 14:
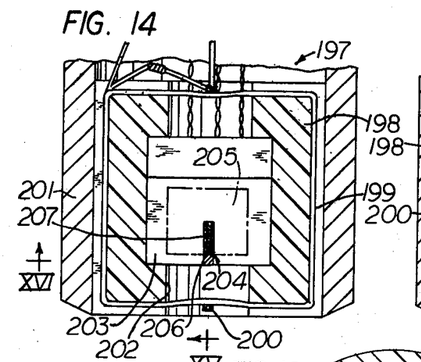
FIGURE 14 is a cross-sectional view of still another modified probe constructed in accordance with the principles of this invention.
Figure 15:
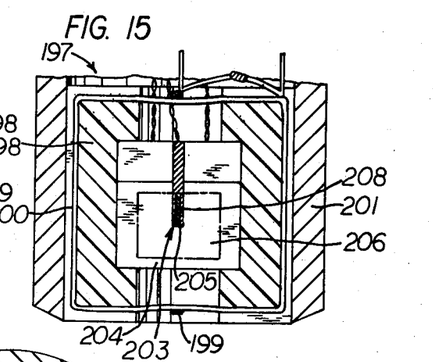
FIGURE 15 is a cross-sectional view taken substantially along line XV—XV of FIGURE 14.
Figure 16:
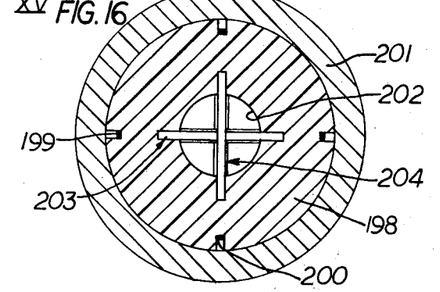
FIGURE 16 is a cross-sectional view taken substantially along line XVI—XVI of FIGURE 14.

The ends of the coils 187 and 188 are connected to conductors 193 and 194 while the opposite ends thereof are connected to a conductor 195. FIGURE 13 shows the connection of the coils in the energizing and indicating circuit. The coil 190 is connected to the output of the driver stage 45. Ends of the coils 187 and 188 are connected through the conductors 193 and 194 to input terminals of the differential amplifier 49 while the opposite ends of the coils 187 and 188 are connected through the conductor 195 to the contact of a balance potentiometer 196 connected between the conductors 193 and 194, the movable contact of potentiometer 195 being also connected to ground.

With this arrangement, the coil 190 functions as a field-producing coil while coils 187 and 188 function as pick-up coils to respond to the fields produced by eddy currents within the part. The coils 187 and 188 should preferably have exactly the same inductances and resistances, and the operation is generally the same as that of the arrangement of FIGURES 1–5.

Referring to FIGURES 14–17, reference numeral 197 generally designates another modified probe which includes a bobbin 198, similar to the bobbin 28, which supports a pair of crossed coils 199 and 200, which are wound in narrow slits formed in the bobbin 198. The bobbin 198 is fixed within a hollow casing 201 and has a central opening 202 with radially outwardly extending notches being provided for receiving a pair of Hall probes 203 and 204 including active elements 205 and 206 in the form of relatively thin flat plates intersecting at the axis of the casing 201. The probes 203 and 204 are provided with notches 207 and 208 along mid-lines thereof, to so interfit that the notch in each probe receives a portion of the other probe opposite the notch therein. The probes 203 and 204 are aligned with the coils 199 and 200, in coplanar relation thereto.

Figure 17:
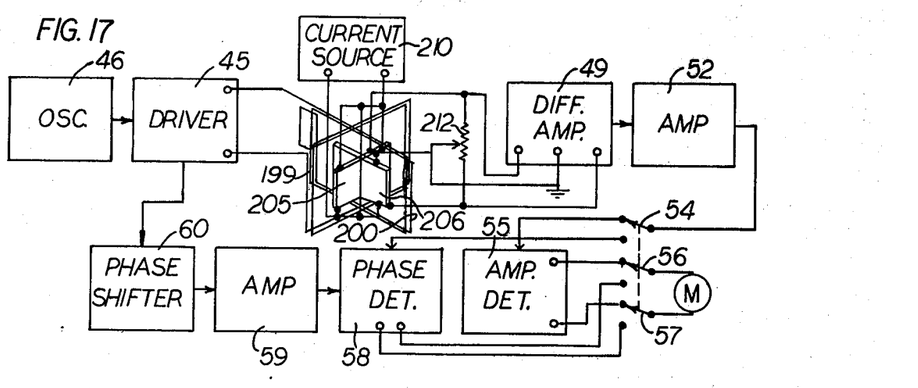
FIGURE 17 is a schematic diagram illustrating the connection of the probe unit of FIGURES 14–16 in the instrument.

Referring to FIGURE 17, the coils 199 and 200 are connected to the output of the driver stage 45. Opposite ends of the active elements 205 and 206 are connected to output terminals of a current source 210 which may preferably be a DC source, although an AC source may be used. Electrodes on faces of the elements 205 and 206 are connected to input terminals of the differential amplifier 49 and also to opposite end terminals of a balance potentiometer 212 having a movable contact connected to ground and to the electrodes on the other faces of the elements 205 and 206.

The coils 199 and 200 and the probes 203 and 204 have matched characteristics such that the fields intersecting the probes and the output signals therefrom are equal when the probe 197 is moved over a homogeneous part, or toward and away from a part, while a large differential in the signals is produced in response to cracks in a part.

It will be understood that modifications and variations may be effected without departing from the spirit and scope of the novel concepts of this invention.

We claim as our invention:

1. In an eddy current system for detecting narrow cracks in a part, field producing and sensing means arranged for producing eddy currents in the part and for sensing eddy current induced fields traversing a pair of planes generally transverse to each other and crossing in a line of intersection transverse to a surface portion of the part, and detector means for detecting differences between the intensities of said eddy current fields traversing said pair of crossing planes, said field producing and sensing means comprising a bobbin, a pair of coils wound on said bobbin in said pair of planes to cross at intersection points in said line of intersection and centrally located in opposite end faces of said bobbin, one of said end faces of said bobbin having a pair of crossing narrow slits receiving a pair of crossing portions of said pair of coils and being adapted for placement in close proximity to said surface portion of the part, the dimensions of said narrow slits being a small fraction of the dimension between said opposite end faces of said bobbin thereby to place said crossing portions of said coils in close proximity to said surface portion of the part and thereby to obtain maximum magnetic coupling with respect to a narrow crack in said surface portion of the part aligned with one of said pair of crossing portions of said coils, an additional coil wound around the sides of said bobbin and having an axis aligned with said line of intersection, means connecting said additional coil to a source of alternating current, said detector means being connected to said pair of coils.

2. In an eddy current system as defined in claim 1, the cross-sectional dimensions of said slits being on the order of 4% of the dimension between opposite side portions of each of said coils.

3. In an eddy current system as defined in claim 1, the dimension between opposite side portions of each of said coils and the dimension between said end faces being on the order of 0.375 inch.

4. In an eddy current system as defined in claim 3, the cross-sectional dimension of said slits being on the order of 0.015 inch.

5. In an eddy current system for detecting narrow cracks in a part, field producing and sensing means arranged for producing eddy currents in the part and for sensing eddy current induced fields traversing pairs of planes generally transverse to each other and crossing in a line of intersection transverse to a surface portion of the part, and detector means for detecting differences between the intensities of said eddy current fields traversing said pairs of crossing planes, said field producing and sensing means comprising a bobbin, a first pair of coils wound on said bobbin in a pair of planes to cross at intersection points in said line of intersection and centrally located in opposite end faces of said bobbin, one of said end faces of said bobbin having a pair of crossing narrow slits receiving a pair of crossing portions of said first pair of coils and being adapted for placement in close proximity to said surface portion of the part, the dimensions of said narrow slits being a small fraction of the dimension between said opposite end faces of said bobbin thereby to place said crossing portions of said coils in close proximity to said surface portion of the part and thereby to obtain maximum magnetic coupling with respect to a narrow crack in said surface portion of the part aligned with one of said pair of crossing portions of said coils, a second pair of coils in planes generally transverse to each other and at substantial angles to the planes of said first pair of coils, said second coils mounted on said bobbin in a manner similar to said first pair of coils, a bridge circuit having two branches each having two legs, said first and second pairs of coils forming the four legs of said bridge circuit, means for applying an AC voltage to said two branches of said bridge circuit, and said detector circuit being connected to the junction between the legs of one of said branches and the junction between the legs of the other of said branches.

6. In an eddy current system for detecting narrow cracks in a part, field producing and sensing means arranged for producing eddy currents in the part and for sensing eddy current induced fields traversing a pair of planes generally transverse to each other and crossing in a line of intersection transverse to a surface portion of the part, and detector means for detecting differences between the intensities of said eddy current fields traversing said pair of crossing planes, said field producing and sensing means comprising a bobbin, a pair of coils wound on said bobbin in said pair of planes to cross at intersection points in said line of intersection and centrally located in opposite end faces of said bobbin, one of said end faces of said bobbin having a pair of crossing narrow slits receiving a pair of crossing portions of said pair of coils and being adapted for placement in close proximity to said surface portion of the part, the dimensions of said narrow slits being a small fraction of the dimension between said opposite end faces of said bobbin thereby to place said crossing portions of said coils in close proximity to said surface portion of the part and thereby to obtain maximum magnetic coupling with respect to a narrow crack in said surface portion of the part aligned with one of said pair of crossing portions of said coils, means for connecting said pair of coils to a source of alternating current, a pair of flat Hall probes respectively disposed within said bobbin in said pair of planes, and means connecting said Hall probes to said detector means.

References Cited

UNITED STATES PATENTS

| | | | |
|---|---|---|---|
| 2,124,579 | 7/1938 | Knerr et al. | 324—40 |
| 2,267,884 | 12/1941 | Zuschlag | 324—40 |
| 2,353,211 | 7/1944 | Zuschlag | 324—40 |
| 2,921,179 | 1/1960 | Anderson | 324—34 |
| 2,955,253 | 10/1960 | Bryant et al. | 324—37 |
| 3,028,092 | 4/1962 | Fay | 324—45 |
| 3,035,353 | 5/1962 | Hovemeyer et al. | 324—45 |
| 3,242,426 | 3/1966 | Burbank | 324—40 |
| 3,311,818 | 3/1967 | Quittner | 324—34 |
| 3,354,385 | 11/1967 | Wood et al. | 324—37 |
| 3,359,495 | 12/1967 | McMaster et al. | 324—40 |

RUDOLPH V. ROLINEC, Primary Examiner

R. J. CORCORAN, Assistant Examiner

U.S. Cl. X.R.

324—40, 45